(12) United States Patent
Mei et al.

(10) Patent No.: US 12,676,657 B2
(45) Date of Patent: Jul. 7, 2026

(54) SYSTEMS AND METHODS FOR CSI PROCESSING UNIT DETERMINATION

(71) Applicant: ZTE CORPORATION, Shenzhen (CN)

(72) Inventors: Meng Mei, Shenzhen (CN); Chuangxin Jiang, Shenzhen (CN); Bo Gao, Shenzhen (CN); Zhaohua Lu, Shenzhen (CN); Ke Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 315 days.

(21) Appl. No.: 18/520,112

(22) Filed: Nov. 27, 2023

(65) Prior Publication Data

US 2024/0097765 A1     Mar. 21, 2024

Related U.S. Application Data

(63) Continuation of application No. PCT/CN2021/110759, filed on Aug. 5, 2021.

(51) Int. Cl.
*H04B 7/06* (2006.01)
*H04L 5/00* (2006.01)
*H04W 76/20* (2018.01)

(52) U.S. Cl.
CPC ......... *H04B 7/0626* (2013.01); *H04L 5/0051* (2013.01); *H04W 76/20* (2018.02)

(58) Field of Classification Search
CPC ..... H04L 5/0051; H04W 76/20; H04B 7/0626
USPC ....................................................... 370/329
See application file for complete search history.

(56) References Cited

U.S. PATENT DOCUMENTS

| | | | | |
|---|---|---|---|---|
| 11,792,822 B2* | 10/2023 | Zhang | ................... | H04L 5/0048 |
| | | | | 370/329 |
| 2019/0260484 A1 | 8/2019 | Nam et al. | | |
| 2021/0028823 A1 | 1/2021 | Park et al. | | |
| 2021/0058125 A1* | 2/2021 | Manolakos | .......... | H04B 7/0626 |

FOREIGN PATENT DOCUMENTS

| | | |
|---|---|---|
| CN | 113169833 A | 7/2021 |
| WO | WO-2020/222602 A1 | 11/2020 |

OTHER PUBLICATIONS

Apple Inc., "Views on Rel-17 HST enhancement", 3GPP TSG RAN WG1 #105-e, R1-2105090, May 27, 2021, e-Meeting (5 pages).
Huawei et al., "Discussion on CSI Enhancements for Rel-17", 3GPP TSG RAN WG1 #105-e, R1- 2104270, May 27, 2021, e-Meeting (24 pages).

(Continued)

*Primary Examiner* — Peter G Solinsky
(74) *Attorney, Agent, or Firm* — Foley & Lardner LLP

(57) ABSTRACT

Embodiments of a system, device and method for CSI processing unit determination are disclosed. In some embodiments, a method includes receiving, by a wireless communication device from a wireless communication node, a configuration for channel state information (CSI) reporting; and determining, by the wireless communication device, a number of CSI processing units (CPUs) to utilize for processing the CSI reporting, according to at least one of the configuration for the CSI reporting or a number of reference signal resources, resource sets, or resource settings.

20 Claims, 22 Drawing Sheets

1800

(56)           References Cited

OTHER PUBLICATIONS

LG Electronics, "Enhancements on beam management for multi-TRP", 3GPP TSG RAN WG1 #105-e, R1-2105781, May 27, 2021, e-Meeting (12 pages).
Nokia et al., "Enhancement on CSI measurement and reporting", 3GPP TSG RAN WG1 Meeting #104bis-e, R1- 2103371, Apr. 20, 2021, e-Meeting (17 pages).
OPPO, "CSI enhancements: MTRP and FR1 Fdd reciprocity", 3GPP TSG RAN WG1 #104e, R1-2100124, Feb. 5, 2021, e-Meeting (12 pages).
Qualcomm Incorporated, "CSI enhancements: MTRP and FR1 Fdd reciprocity", 3GPP TSG RAN WG1 #105-e, R1-2104658, May 27, 2021, e-Meeting (18 pages).
Samsung, "Enhancements on HST-SFN", 3GPP TSG RAN WG1 #105-e, R1-2105294, May 27, 2021, e-Meeting (9 pages).
Samsung, "Views on Rel-17 CSI enhancements", 3GPP TSG RAN WG1#105-e, R1-2105295, May 27, 2021, e-Meeting (25 pages).

VIVO, "Further discussion and evaluation on Multi-TRP CSI and partial reciprocity", 3GPP TSG RAN WG1 #105-e, R1-2104347, May 21, 2021, e-Meeting (34 pages).
Extended European Search Report for EP Appl. No. 21952284.4, dated Jul. 15, 2024 (11 pages).
Kaikkonen, J. et al., "Main Radio Interface Related System Procedures", 5G New Radio: A Beam-based Air Interface, First Edition, Apr. 24, 2020, pp. 261-396.
Ericsson, "On beam management enhancements for simultaneous multi-TRP transmission with multi-panel reception", 3GPP TSG-RAN WG1 Meeting #105-e, R1-2105806, May 27, 2021, eMeeting (8 pages).
Office Action for KR Appl. No. 10-2023-7040628, dated Jan. 21, 2026 (with English translation, 9 pages).
Sony, "Considerations on HST-SFN operation for multi-TRP", 3GPP TSG RAN WG1#104bis, R1-2103291, Apr. 20, 2021, E-meeting (7 pages).
VIVO, "Further discussion and evaluation on HST-SFN transmission schemes", 3GPP TSG RAN WG1 #105-e, R1-2104346, May 27, 2021, e-Meeting (15 pages).
International Search Report and Written Opinion for PCT Appl. No. PCT/CN2021/0110759, mailed Mar. 28, 2022 (9 pages).

* cited by examiner

1600

1610 ~ Receive, from a wireless communication node, a configuration for channel state information (CSI) reporting 1620 ~ Determine, a number of CSI processing units (CPUs) to utilize for processing the CSI reporting, according to at least one of: the configuration for the CSI reporting or a number of reference signal resource or resource sets or resource settings

1700

1710 ⌁ Determine a plurality of control resource sets (CORESETs)

1720 ⌁ Identify, according to the plurality of CORESETs, transmission configuration indicator (TCI) states for reference signals (RSs) to perform radio link monitoring

1800

1810 — Transmit, to a wireless communication device, a configuration for channel state information (CSI) reporting 1820 — Cause the wireless communication device to determine a number of CSI processing units (CPUs) to utilize for processing the CSI reporting, according to at least one of: the configuration for the CSI reporting or a number of reference signal resource sets

SYSTEMS AND METHODS FOR CSI PROCESSING UNIT DETERMINATION

CROSS-REFERENCE TO RELATED APPLICATION

This application claims the benefit of priority under 35 U.S.C. § 120 as a continuation of International Patent Application No. PCT/CN2021/110759, filed on Aug. 5, 2021, the disclosure of which is incorporated herein by reference in its entirety.

TECHNICAL FIELD

The disclosure relates generally to wireless communications and, more particularly, to systems and methods for CSI processing unit determination.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

Embodiments of a system, device and method for CSI processing unit determination are disclosed. In some embodiments, a method includes receiving, by a wireless communication device from a wireless communication node, a configuration for channel state information (CSI) reporting; and determining, by the wireless communication device, a number of CSI processing units (CPUs) to utilize for processing the CSI reporting, according to at least one of the configuration for the CSI reporting or a number of reference signal resources, resource sets, or resource settings.

In some aspects, the configuration for CSI reporting includes at least one of frequency offset reporting Doppler shift reporting, or group based beam reporting. In some aspects, the method includes determining, by the wireless communication device, that the number of CPUs to utilize for processing the CSI reporting is one, for at least one CSI report configured to report frequency offset information corresponding to one or more reference signal (RS) resource sets or resources settings.

In some aspects, a method includes determining, by a wireless communication device, a plurality of control resource sets (CORESETs) and identifying, by the wireless communication device, according to the plurality of CORESETs, transmission configuration indicator (TCI) states for reference signals (RSs) to perform radio link monitoring. In some aspects, the plurality of CORESETs is associated with search space sets having a same monitoring periodicity.

In some aspects, a method includes transmitting, by a wireless communication node to a wireless communication device, a configuration for channel state information (CSI) reporting and causing the wireless communication device to determine a number of CSI processing units (CPUs) to utilize for processing the CSI reporting, according to at least one of: the configuration for the CSI reporting or a number of reference signal resource sets.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Network Environment and Computing Environment

Figure 1:
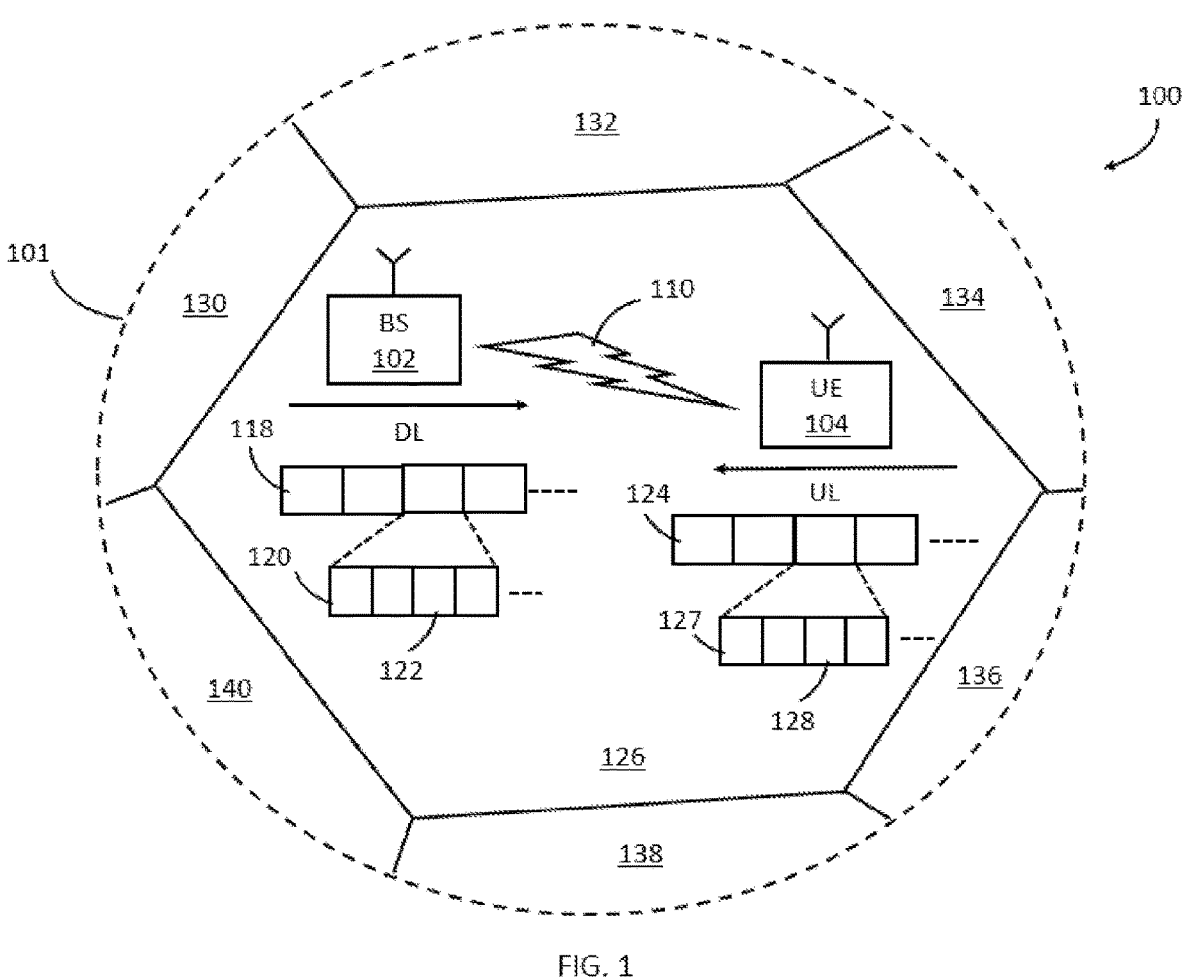
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
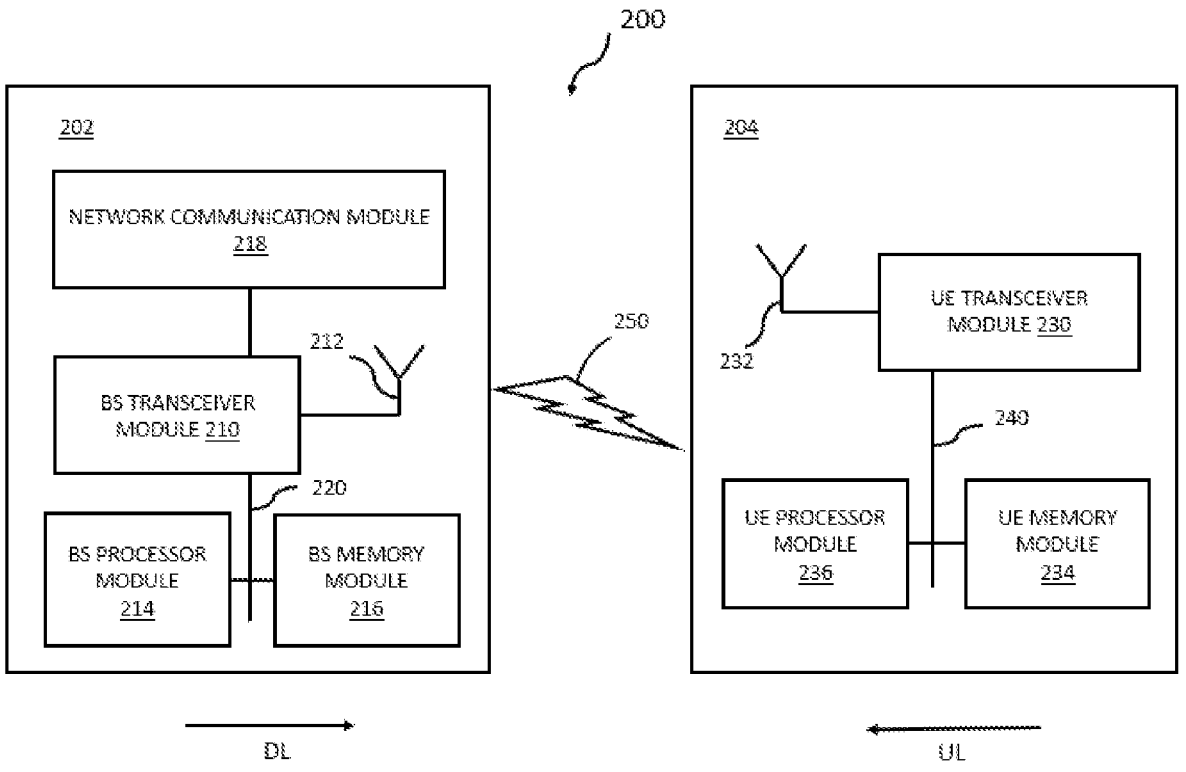
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

B. CSI Processing Unit Determination

In a single-frequency network (SFN) scenario, if pre-compensation is supported, the frequency offset can be provided to a Next Generation NodeB (gNB, e.g., a base station (BS), the BS 102, the BS 202, a wireless communication node, a cell, a cell tower, a radio access device, a transmit receive point (TRP), etc.) side. In some embodiments, the gNB can use the frequency offset for pre-compensation. In some embodiments, a user equipment (UE, e.g., the UE 104, the UE 204, a mobile device, a wireless communication device, a terminal, etc.) measures or estimates the frequency offset (e.g., caused by high speed motion) according to a tracking reference signal (TRS) associated with each transmission configuration indicator (TCI) state. In some embodiments, once the frequency offset is estimated, it would be helpful/beneficial to have a method/mechanism for the UE to report the frequency offset to the gNB. Disclosed herein are embodiments of a method/mechanism to report the frequency offset of multiple TRS in the SFN based transmission.

In some embodiments for channel state information (CSI) processing progress, (e.g., whether used for an SFN scenario or another scenario) one or some parameters, e.g. reference signal received power (RSRP), signal-to-noise-plus-interference ratio (SINR), frequency offset reporting, or block error rate (BLER), are reported. Disclosed herein are embodiments of determining how to report these parameters, and determining how many CSI processing unit(s) are to be used, activated, occupied, deployed, or otherwise configured (for CSI processing).

In the SFN-based transmission, multiple TRPs transmit a same physical downlink shared channel (PDSCH) or physical downlink control channel (PDCCH) to one UE. But in high speed (e.g., train) scenarios for instance, the UE moves fast from one TRP to another TRP, so the frequency offset caused by high speed motion is different from different TRPs to the same UE, or even opposite. In some embodiments, the PDSCH or PDCCH from different TRPs are combined or aggregated at the UE side. Thus, different frequency offsets may impact the PDSCH or PDCCH estimation/measurement. For example, if UE in the middle of (e.g., half-way in between) the two TRPs, the frequency offsets are opposite from the two TRPs, and the combined TRS ports from the two TRPs estimate the frequency offset as 0 Hz (e.g., due to cancelation of the opposite frequency offsets). Thus, one problem may be that the combined TRS ports may obtain the wrong frequency offsets estimation, for instance, when the UE is in between the two TRPs. Thus, different TRS ports can be configured for different TRPs for the UE to estimate the frequency offsets (Doppler shifts).

Pre-compensation at gNB side can be used to pre-compensate the frequency offset and make the PDSCH or PDCCH aligned from different TRPs. One technological challenge is that gNB is to obtain the frequency offsets for different TRS ports, and use them to pre-compensate a PDSCH or PDCCH from different TRPs.

For CSI reporting, in some embodiments, one trigger state can trigger one or more CSI reportings, and one or more parameters are to be reported, and a number of CSI processing unit(s) is to be used/occupied/activated/executed for this reporting.

In some implementations, the UE indicates the number of supported simultaneous CSI calculations (e.g., which may be equal to $N_{CPU}$) with parameter simultaneousCSI-ReportsPerCC in a component carrier, and simultaneousCSI-ReportsAllCC across all component carriers. If a UE supports $N_{CPU}$ simultaneous CSI calculations it is said to have $N_{CPU}$ CSI processing units for processing CSI reports. If L CSI processing units (CPUs) are occupied for calculation of CSI reports in a given OFDM symbol, the UE has $N_{CPU}-L$ unoccupied CPUs. If N CSI reports start occupying their respective CPUs on the same OFDM symbol on which $N_{CPU}-L$ CPUs are unoccupied, where each CSI report $n=0, \ldots, N-1$ corresponds to $$O_{CPU}^{(n)},$$

the UE is not required to update the N−M requested CSI reports with lowest priority, where $0 \leq M \leq N$ is the largest value such that $$\sum_{n=0}^{M-1} O_{CPU}^{(n)} \leq N_{CPU} - L$$

holds.

A UE is not expected to be configured with an aperiodic CSI trigger state containing more than $N_{CPU}$ Reporting Settings. Processing of a CSI report occupies a number of CPUs for a number of symbols as follows:

$O_{CPU}=0$ for a CSI report with CSI-ReportConfig with higher layer parameter reportQuantity set to 'none' and CSI-RS-ResourceSet with higher layer parameter trs-Info configured $O_{CPU}=1$ for a CSI report with CSI-ReportConfig with higher layer parameter reportQuantity set to 'cri-RSRP', 'ssb-Index-RSRP', 'cri-SINR', 'ssb-Index-SINR' or 'none' (and CSI-RS-ResourceSet with higher layer parameter trs-Info not configured)

for a CSI report with CSI-ReportConfig with higher layer parameter reportQuantity set to 'cri-RI-PMI-CQI', 'cri-RI-i1', 'cri-RI-CQI', or 'cri-RI-LI-PMI-CQI', if a CSI report is aperiodically triggered without transmitting a PUSCH with either transport block or HARQ-ACK or both when L=0 CPUs are occupied, where the CSI corresponds to a single CSI with wideband frequency-granularity and to at most 4 CSI-RS ports in a single resource without CSI-RS resource indicator (CRI) report and where codebookType is set to 'typeI-SinglePanel' or where reportQuantity is set to 'cri-RI-CQI', $O_{CPU}=N_{CPU}$, otherwise, $O_{CPU}=K_s$, where $K_s$ is the number of CSI-RS resources in the CSI-RS resource set for channel measurement.

In some embodiments, the UE receives the CSI reporting configuration. In some embodiments, the UE associates/determines the number of occupied CSI processing units (CPUs) with/according to a pre-defined rule, e.g., a number of configured reference signal resource sets and the configured reporting contents (e.g., SINR, RSRP, BLER (block error rate), etc.) in the CSI reporting configuration. In some embodiments, a number of occupied CPUs equals to one for frequency offset reporting (configured via higher layer parameters, such as RRC parameters) corresponding to higher layer (e.g., RRC parameter) configured TRS(s), for at least one CSI reporting triggered by one trigger state. The frequency offset can be referred to as a Doppler shift. In some embodiments, the Doppler shift is at least caused by the relative moving of the gNB and the UE and can be calculated by configuring the Doppler shift estimation-related reference signal.

In some embodiments, one CPU is occupied for an aperiodic TRS with a TCI state that is different from (other/existing) activated TCI states for (e.g., of, associated with, activated for) at least one of: PDSCH, PDCCH, periodic TRS, CSI-reference signal (RS), synchronization signal block (SSB). In some embodiments, the number of CPUs is the same as the number of configured reference signal resource sets or the number of configured RSs to be reported, for at least one of: (a) the higher layer parameters configuring group based beam reporting or (b) the higher layer parameters configuring the number of RSs to be reported (e.g., for beam reporting) to be larger than one.

In some embodiments, the UE receives a configuration from the gNB with information on one or more CORESETs. In some embodiments, if more than one CORESET is associated with search space sets having a same monitoring periodicity, the UE determines or identifies the order of the TCI states (e.g., the UE determines or identifies the TCI states and RSs using ordering rules) from: (a) the CORESET activated with 2 TCI states, (b) the first TCI state in the CORESEST activated with 2 TCI states, (c) the TCI state of a CORESET activated with 2 TCI states that are different from the TCI state(s) in another CORESET with a higher index, (d) the TCI state from a CORESET with a higher index, wherein the UE ignores the CORESET with 2 TCI state, or (e) the TCI states that are grouped and associated with a/one CORESET index, wherein each group of TCI states corresponds to a respective RS pair that can be used to calculate one combined BLER or SINR or RSRP (for the RS pair). In some embodiments, the UE performs radio link monitoring and/or reporting using the identified RSs.

In some embodiments, the occupied/activated number of CPUs is to be associated with the reporting contents and/or the CSI related reference signal resource set, setting, or resource (e.g., configured or indicated in the CSI report configuration from the gNB or base station).

For aperiodic or semi-persistent CSI reporting, in some embodiments, one trigger state triggers at least one aperiodic or semi-persistent CSI report configuration, and the resource configuration in the CSI report configuration contains at least one resource setting, resource set, or resource. In some embodiments, each resource setting, resource set, or resource is configured to UE for measurement and reporting. For periodic CSI reporting, the CSI reporting is configured by radio resource control (RRC) signaling, and the CSI reporting may only depend on the CSI report configuration (e.g., instead of being triggered by the trigger state).

For periodic CSI reporting, in some embodiments, the CSI report configuration contains/includes/indicates/identifies/configures at least one resource setting, resource set, or resource. In some embodiments, each resource setting, resource set, or resource is configured to the UE for measurement and reporting. In some embodiments, the CSI reporting is configured by radio resource control (RRC) signaling.

In some embodiments, for SFN-based transmission, different TRS resources, resource sets, or resource settings are configured for the different transmissions of different TRPs. In some embodiments, if two TRS resource settings (sets or resource) are configured or indicated for two groups of TRPs, these two groups of TRPs are indicated by different TCI states or TRSs. The UE can estimate and report the frequency offsets from/using (or according to) these different TRSs.

In some embodiments in which each frequency offset is estimated from each TRS resource or resource set or setting, the frequency offsets are to be reported to the gNB. In some embodiments, if the frequency offset is configured to be reported, e.g., enabled by RRC parameters or indicated by downlink control information (DCI) or activated by medium access control (MAC), or indicated by the configuration of CSI report (as a new parameter is configured in the groups to be reported, such as the 'report quantity' field in the CSI report configuration or configured TRSs as the reference signal), at least one frequency offset is to be reported.

Figure 3A:
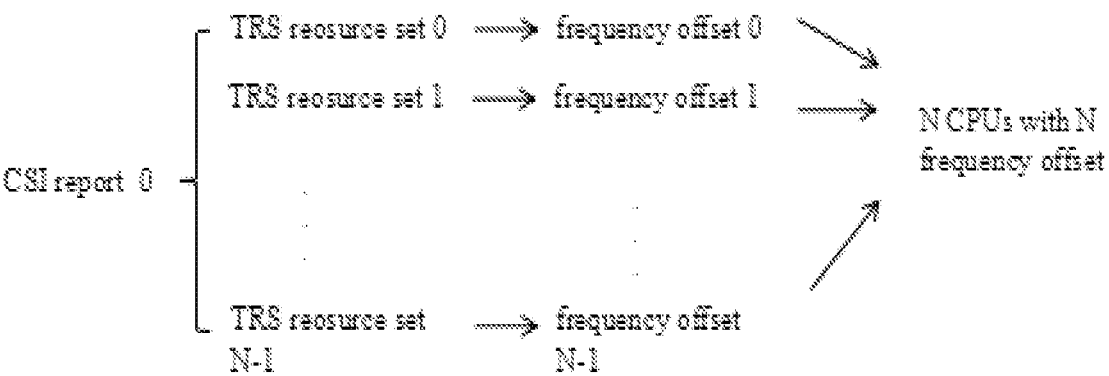
FIGS. 3A and 3B illustrate N CPUs with N frequency offset reportings (or reports) for one CSI reporting, in accordance with some embodiments.
Figure 3B:
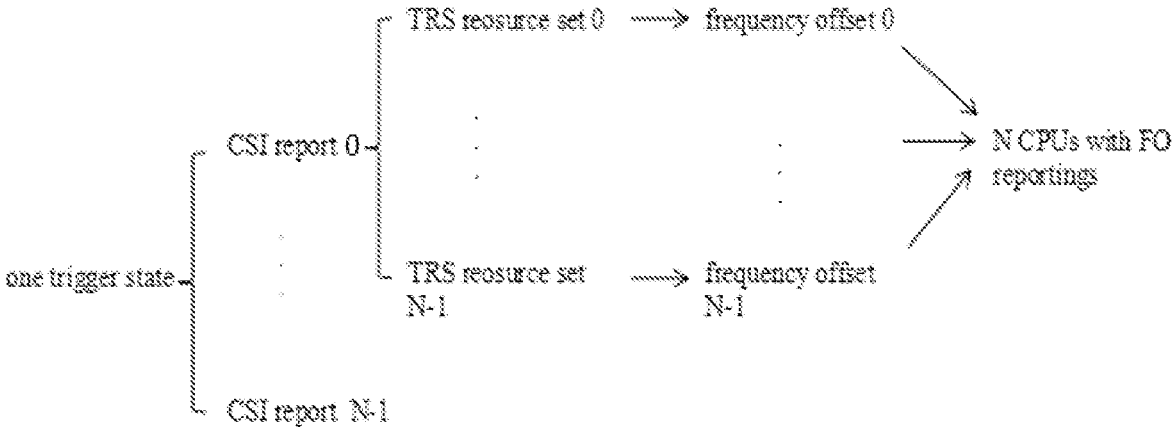

FIGS. 3A and 3B illustrate N CPUs with N frequency offset reportings for one CSI reporting, in accordance with some embodiments. In some embodiments in which the estimated frequency offset (FO) is to be reported for each configured TRS resource set, setting, or resource, the number of reported frequency offsets is the same as the (number of) configured TRS resource sets, resources, or resource settings. For example, in some embodiments, 2 TRS resource sets are configured in one CSI report configuration, 2 frequency offsets are to be measured to be reported, and 2 CPUs are to be occupied for this CSI reporting (e.g., occupied for performing the measurement, processing the measurement, generating the CSI or CSI reporting, and/or sending the CSI reporting). In some embodiments, the number of occupied CPUs is the same as the (number of) TRS resource sets, settings, or resources in one CSI reporting, as shown in FIGS. 3A-3B, 4A-4B, 5A-5B, and 6A-6B.

In some embodiments, for periodic CSI reporting, N TRS resource sets are configured for one CSI report configuration, and N CPUs are used/occupied/employed/deployed for the frequency offset reporting, as shown in FIGS. 3A, 4A, 5A, and 6A.

In some embodiments, for aperiodic and semi-persistent CSI reporting, one trigger state triggers one or more CSI report configuration, and each CSI report configuration is configured with at least one RS resource set, as shown in FIGS. 3B, 4B, 5B, and 6B.

Figure 4A:
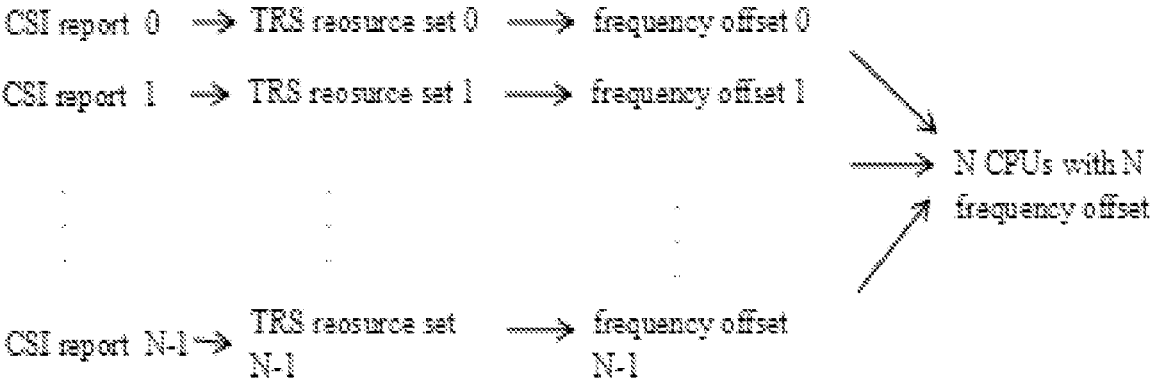
FIGS. 4A and 4B illustrate N CPUs with N frequency offset reportings for N CSI reportings, in accordance with some embodiments.
Figure 4B:
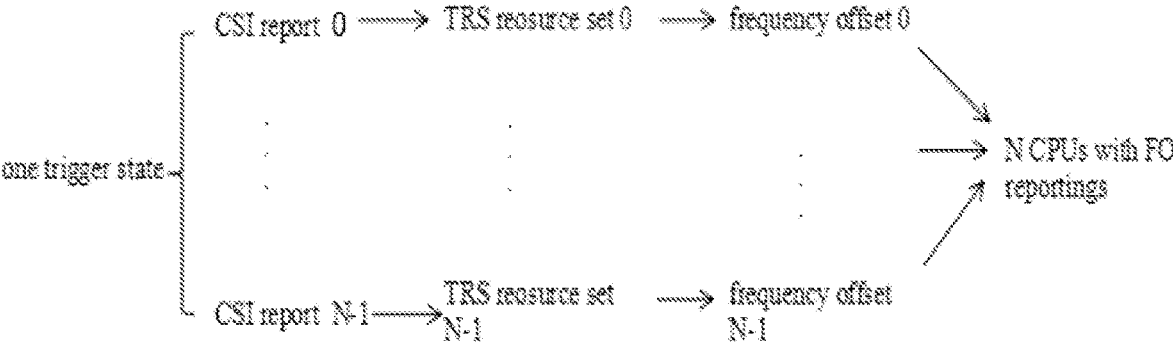

FIGS. 4A and 4B illustrate N CPUs with N frequency offset reportings for N CSI reportings (or CSI reports), in accordance with some embodiments. In some embodiments, for the case of N frequency offsets, each CSI report is configured with one TRS resource or resource set or resource setting. In some embodiments, the number of CPUs for frequency offset reporting is the same as the number of frequency offsets for one trigger state as shown in FIGS. 4A-4B.

Figure 5A:
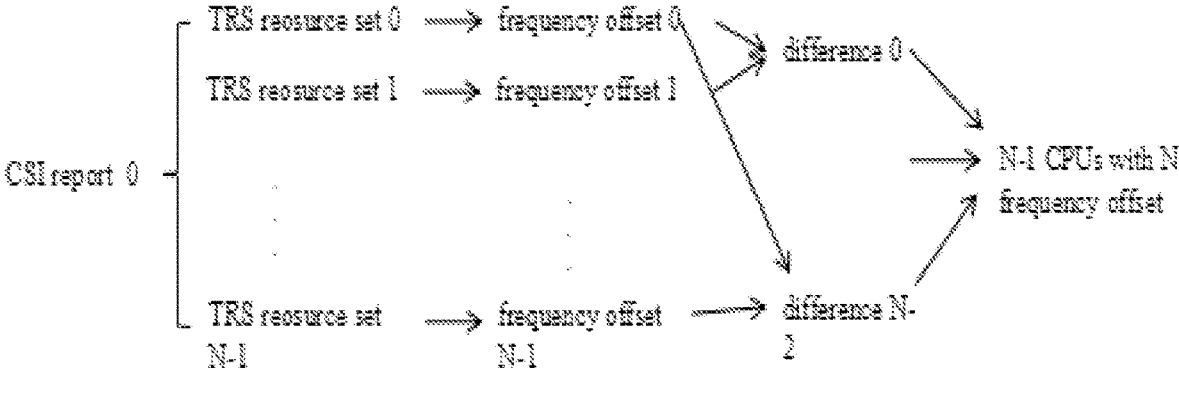
FIGS. 5A and 5B illustrate N−1 CPUs with N−1 frequency offset differences for one CSI report, in accordance with some embodiments.
Figure 5B:
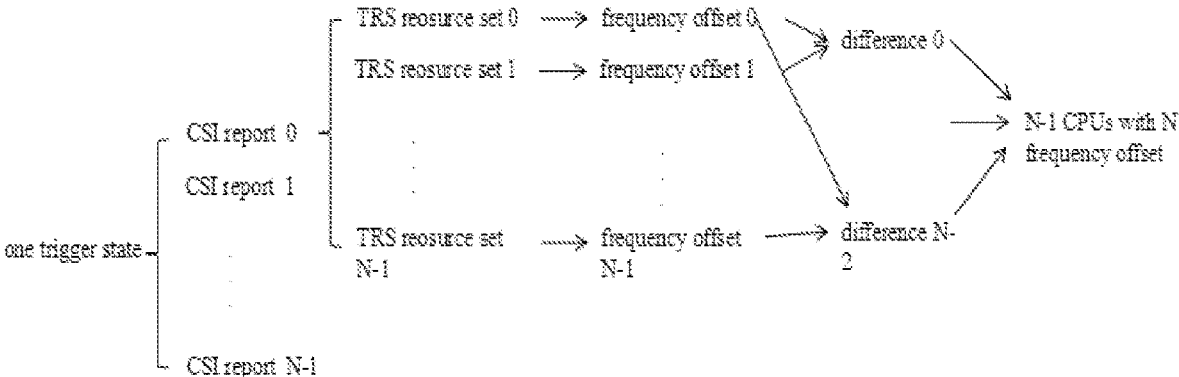

FIGS. 5A and 5B illustrate N−1 CPUs with N−1 frequency offset differences for one CSI report, in accordance with some embodiments. In some embodiments, if the difference of the measured frequency offset (e.g., FO difference, or relative FO) is reported, e.g., if 4 TRSs are configured, 4 frequency offsets can be estimated each based on a respective TRS, and 3 difference frequency offsets are to be reported. In some embodiments, the frequency offset difference is calculated based on one reference frequency offsets from one TRS (identified/selected from the TRSs). For example, in some embodiments, a default, configured, or indicated TRS (e.g., defaulted/preconfigured/predefined as a first, last, or at least one other TRS of the TRSs) is treated as the reference TRS. In some embodiments, the frequency offset estimated based on the reference TRS is treated as the reference frequency offset, and the difference frequency offsets are estimated based on the other 3 frequency offsets and this reference frequency offset. In some embodiments, for such a case, only 3 frequency offsets are to be reported and only 3 CPUs are to be occupied. In some embodiments, the number of occupied CPUs is one less than the number of configured TRS resources or resource sets or settings in the CSI report, as shown in FIGS. 5A-5B.

Figure 6A:
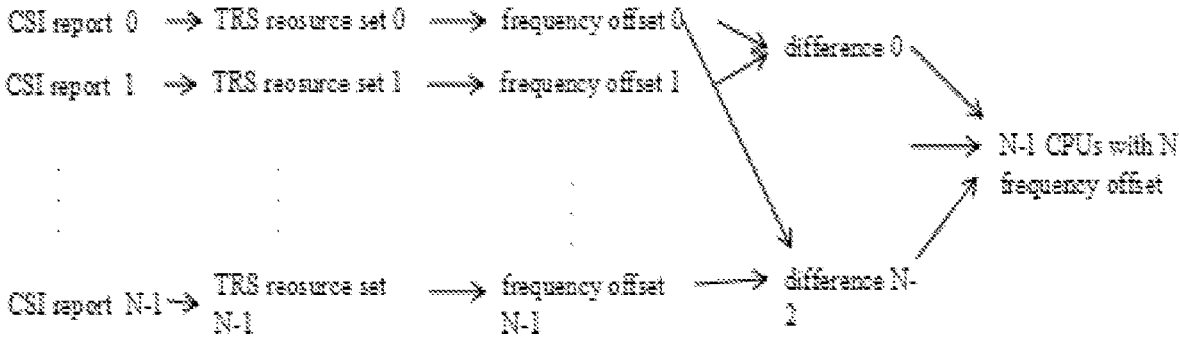
FIGS. 6A and 6B illustrate N−1 CPUs with N−1 frequency offset differences (sometimes referred to as relative frequency offsets) for N−1 CSI reportings, in accordance with some embodiments.
Figure 6B:
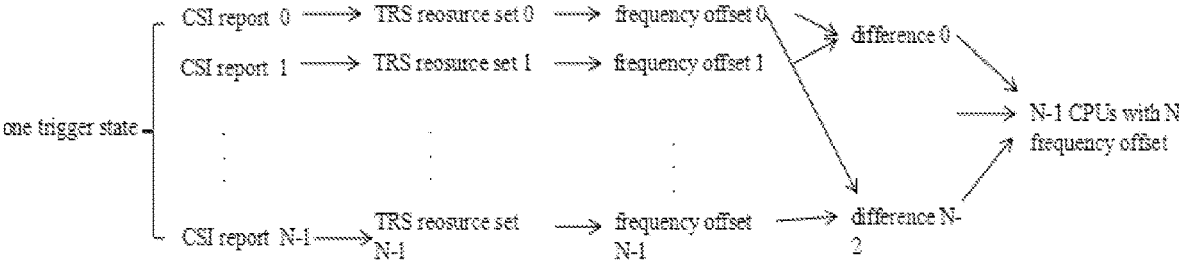

FIGS. 6A and 6B illustrate N−1 CPUs with N−1 frequency offset differences for N−1 CSI reports/reportings, in accordance with some embodiments. In some embodiments, for the case of N frequency offsets for one trigger state, each CSI report is configured with one TRS resource or resource set or resource setting. The number of occupied/employed/activated CPUs is one less than the number of configured TRS resources or resource sets or settings in the CSI report, as shown in FIGS. 6A-6B.

In some embodiments, only one CPU for all the frequency offset reportings is enough for one CSI report configuration or all the CSI report configurations of one trigger state, if the CSI reporting is configured with frequency offset reporting.

In some embodiments, for an aperiodic TRS, which is not limited to frequency offset (e.g., can be applied to frequency offset reporting, time domain offset reporting, etc.), if the TCI states for this aperiodic TRS are different from the TCI states activated for PDSCH or PDCCH or other RSs, the aperiodic TRS is to be measured and reported, and one CPU (CSI processing unit) is to be occupied/employed/used for the corresponding aperiodic TRS CSI reporting. In some embodiments, if more than one aperiodic TRS (e.g., resource, resource set, or resource setting) is configured, activated, or indicated, the number of CPUs is to be the same as the number of aperiodic TRS resources, resource sets, or resource settings.

Figure 7:
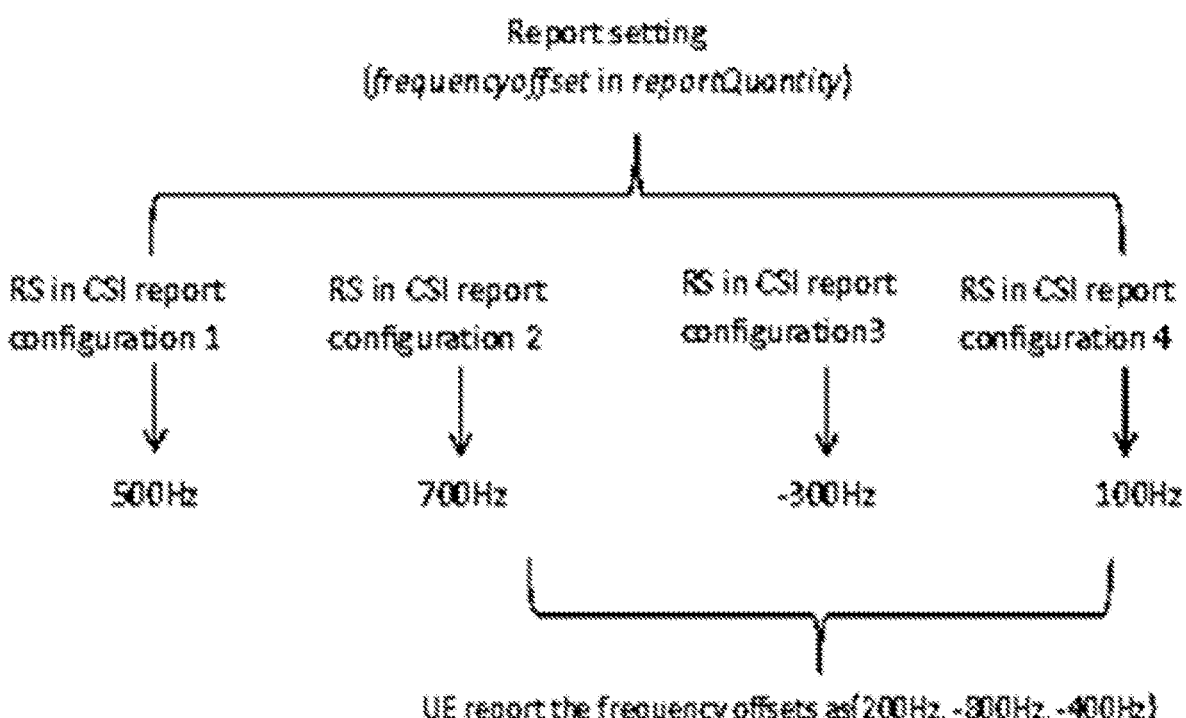
FIG. 7 illustrates multiple CSI report configuration IDs contained in the CSI reporting configuration, in accordance with some embodiments.

FIG. 7 illustrates multiple CSI report configuration IDs contained in the CSI reporting configuration, in accordance with some embodiments. For CSI reporting configuration(s), multiple CSI report configuration IDs can be contained in the CSI reporting configuration(s), each report configuration ID can be configured with at least one RS resource set, and the relative values of the IDs can be calculated between these CSI configuration IDs. For aperiodic CSI reporting, one trigger state can trigger multiple CSI reporting configurations according to the configuration IDs, and the RS resource sets configured in these configurations can be measured and reported. In some embodiments, for CPU occupation, if the frequency offset (Doppler shift) is configured and only one RS resource set or setting is configured in the reporting configuration or triggered by one trigger state, then N, N−1, or just one is supported based on the introduction of the CPU occupation disclosed herein.

Figure 8:
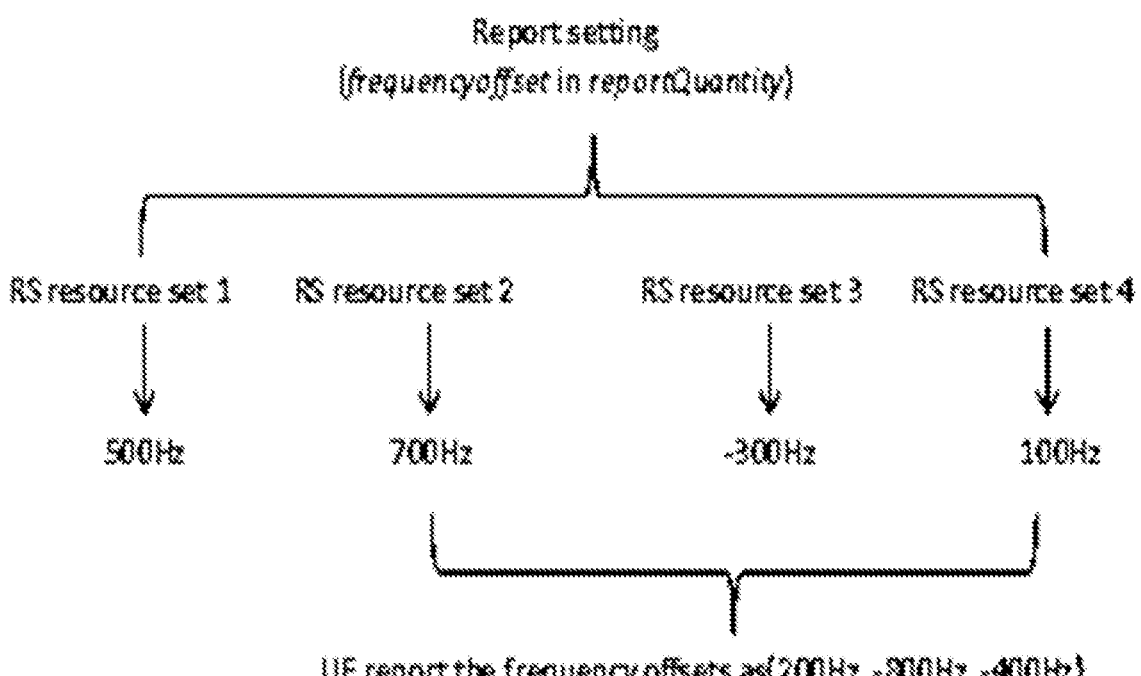
FIG. 8 illustrates multiple CSI-RS or SSB contained in the CSI reporting configuration, in accordance with some embodiments.

FIG. 8 illustrates multiple CSI-RS or SSB contained in the CSI reporting configuration, in accordance with some embodiments. For CSI reporting configuration(s), multiple CSI-RS or SSB (e.g., including resource sets, settings, or resources) can be contained in the CSI reporting configuration(s), each report configuration can be configured with at least one RS resource set, and the relative values of the other RS can be calculated between these RSs. For aperiodic CSI reporting, one trigger state can trigger multiple RS resource sets or settings or resources configured in the configurations can be measured and reported. For CPU occupation, if frequency offset (Doppler shift) is configured and at least one RS resource set or setting is configured in the reporting configuration or triggered by one trigger state, N, N−1, or just one is supported based on the introduction of the CPU occupation disclosed herein.

In some embodiments, for CSI reporting, one CSI reporting is configured with several RS resource sets, e.g., for beam management. In some embodiments, a number of occupied/employed/activated CPUs is associated with the configured number of RS resource sets.

Figure 9:
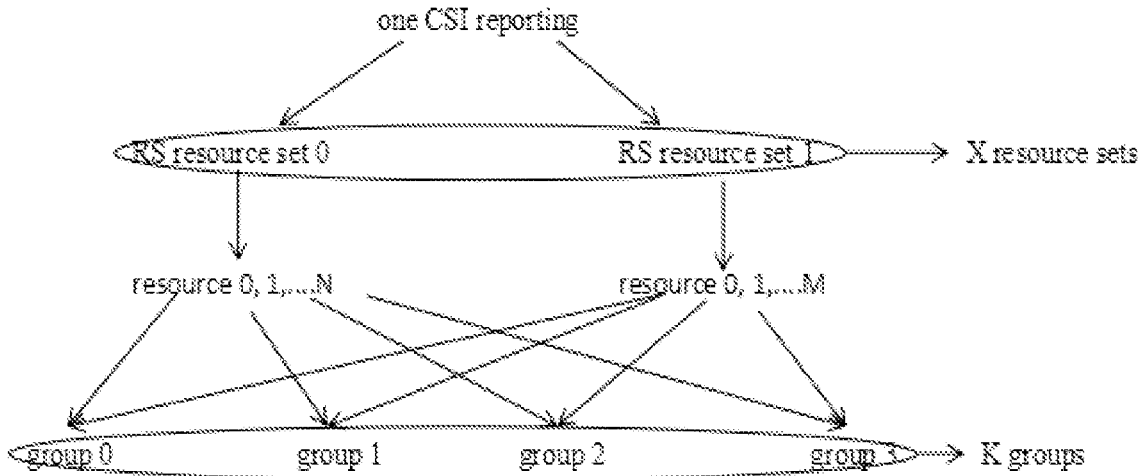
FIG. 9 illustrates group based reporting, in accordance with some embodiments.

FIG. 9 illustrates group based reporting, in accordance with some embodiments. In some embodiments, if there is a higher layer configured CSI-RS or SSB for beam management, e.g., the repetition (e.g., repetitive transmissions or repeated content) of CSI-RS or SSB is configured, more than one RS resource set is configured in one CSI reporting or enabled by the higher layer parameters in the CSI reporting configuration, and the number of CPUs is to be the same as the number of configured RS resource sets. As shown in FIG. 9, in some embodiments, X RS resource sets are configured for one CSI reporting, each RS resource set contains a number of resources, and the UE reports the related SINR, RSRP, CRI, or SSB index based on K groups. In some embodiments, each group contains Y resources (e.g., Y equals to X), and every element on each group comes from different resource sets. For example, in some embodiments, X equals to 2, and K equals to 4, as shown in FIG. 9, and group 0 contains the reporting contents from one resource of RS resource set 0 and one resource of RS resource set 1. Another case can be that if group based beam reporting is enabled or the reported RS is configured larger than one, X beam related parameters (calculated from X CSI-RS or SSB resource sets) is reported and X CPU are to be occupied.

The number of occupied CPUs for this reporting can be determined in a number of embodiments. In some embodiments, the number of occupied CPUs is associated with the X configured resource sets or X reporting beams in one group (one CSI reporting), e.g., X CPUs are for X configured RS resource sets, for one CSI reporting configuration.

In some embodiments, the number of occupied CPUs is associated with the number of reporting groups, e.g., K CPUs are for K CSI reporting groups.

In some embodiments, whether the number of occupied CPUs is associated with the number of configured RS resource sets depends on UE capability, e.g. whether the UE supports being configured with multiple resource sets for one CSI reporting, or how many resource sets can be supported for one CSI reporting.

In some embodiments, for radio link monitoring, the UE is provided (e.g., for PDCCH receptions) TCI states that include one or more CSI-RSs. In some embodiments, up to 2 CSI-RSs can be used as the RSs for radio link monitoring, but for SFN-based transmission, a PDCCH can be activated with 2 TCI states for one CORESET and up to 3 CORESETs can be supported for one PDCCH in an activated bandwidth part. One CSI-RS can be configured for one TCI state. Disclosed herein are embodiments of determining how to choose or select the CSI-RS(s) for radio link monitoring purposes.

In some implementations/embodiments, the RS is selected using the following method: the UE selects the $N_{RLM}$ RS provided for active TCI states for PDCCH receptions in CORESETs associated with the search space sets in an order from the shortest monitoring periodicity. In some embodiments, if more than one CORESET is associated with search space sets having the same monitoring periodicity, the UE determines the order of the CORESET starting from (e.g., by first considering) the highest CORESET index, followed by next CORESET(s) with lower CORESET index(es).

Figure 10:
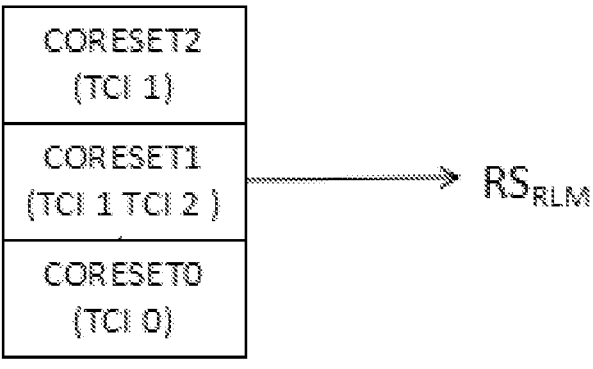
FIG. 10 illustrates a CORESET with 2 TCI states having a higher priority than a CORESET with one TCI state, in accordance with some embodiments.

FIG. 10 illustrates a CORESET with 2 TCI states having a higher priority than a CORESET with one TCI state, in accordance with some embodiments. In some embodiments, if 2 TCI states are activated for one CORESET, the CORESET with 2 TCI states is to have a higher priority than a CORESET with only one TCI states, if these CORESETs are associated with the search space set in the same monitoring periodicity. As shown in FIG. 10, each of CORESETs 0 and 2 is activated with one TCI state, and CORESET 1 is activated with 2 TCI states. Thus, in some embodiments, the RS configured in the two TCI states in CORESET 1 is to be used as the RS for radio link monitoring. In some embodiments, if there are other CORESET(s) activated with 2 TCI states, the CORESET with a higher index provides the RS for radio link monitoring. In some embodiments, the CORESET activated with 2 TCI states can be selected without the restriction of the search space sets monitoring periodicity, e.g., a CORESET activated with 2 TCI states can have a higher periodicity than a CORESET activated with only one TCI state even if the search space set monitoring periodicity is different from (e.g., larger than) the CORESET activated with only one TCI state.

Figure 11:
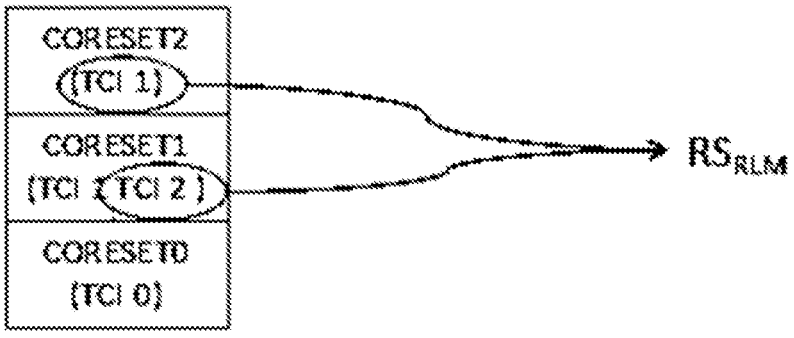
FIG. 11 illustrates radio link monitoring RSs provided in the order of their CORESET indexes, in accordance with some embodiments.

FIG. 11 illustrates RSs for radio link monitoring that are provided in the order of their CORESET indexes, in accordance with some embodiments. In some embodiments, the RSs for radio link monitoring are selected in the order of their CORESET indexes for the same search space sets having the same monitoring periodicity. For example, in some embodiments, the RS is to be chosen from a CORESET with higher CORESET index, e.g., as shown in FIG. 11, CORESET 2 is activated with one TCI state, and CORESET 1 is activated with 2 TCI states, such that the RS configured in the TCI state of CORESET 2 is to be used as the one of the RSs for radio link monitoring, and the other RS is to be chosen from CORESET 1. In some embodiments, this is because 2 TCI states are activated for CORESET 1, and only one RS is chosen for radio link monitoring.

FIG. 11 discloses embodiments of approaches/methods to choose one RS from the two TCI states of CORESET 1. In some embodiments, if one of the TCI states of CORESET 1 is the same as CORESET 2, the RS configured in other TCI state of CORESET 1 is to be chosen as the RS for radio link monitoring. In some embodiments, when TCI state 1 is activated for both CORESET 1 and CORESET 2, the RS in TCI state 1 of CORESET 2 is chosen as one of RS for the radio link monitoring, and the RS in TCI state 2 (e.g., different from TCI state 1 for which a RS is already chosen) in CORESET 1 is selected as the other RS for radio link monitoring.

In some embodiments, if the two TCI states in CORESET 1 are not the same as the TCI state in CORESET 2, any one RS of the two TCI states can be used as the RS for radio link monitoring. For example, in some embodiments, the RS in the TCI state with lower index or higher index (or from the first activated TCI state) can be used as the RS for radio link monitoring.

Figure 12:
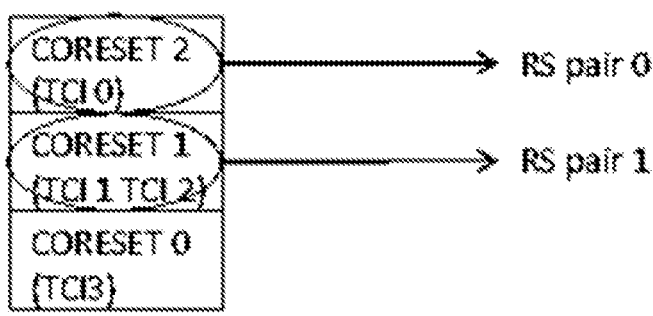
FIG. 12 illustrates a radio link monitoring RS pair, in accordance with some embodiments.

FIG. 12 illustrates a radio link monitoring RS pair, in accordance with some embodiments. For some embodiments of different CORESETs with a different number of TCI states for one PDCCH, up to 2 RS pairs can be used for the radio link monitoring. For example, in some embodiments, the single RS in CORESET 2 is treated as one RS pair (even though there is only 1 RS in it), and the two RSs in the two TCI states of CORESET 1 is used as the other RS pair for radio link monitoring. Each RS pair can be used to calculate a combined BLER or SINR or RSRP.

Figure 13:
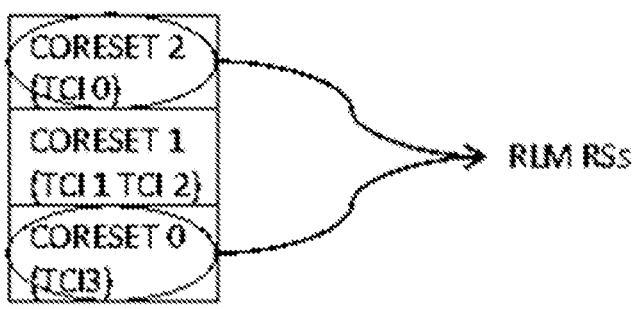
FIG. 13 illustrates radio link monitoring RS in a CORE-SET with one TCI state, in accordance with some embodiments.

FIG. 13 illustrates radio link monitoring RS in a CORESET with one TCI state, in accordance with some embodiments. The CORESET with 2 TCI states can be ignored for the radio link monitoring. For example, in the case of CORESET 2 with one TCI state and the corresponding RS is used as the radio link monitoring RS, whereas CORESET 1 is activated with 2 TCI states, and none of the two TCI states is used as for radio link monitoring. As shown in FIG. 13, TCI states in CORESET 1 are ignored, and the RSs in CORESET 2 and CORESET 0 are used as RSs for the radio link monitoring. In such a case, there are to be at least 2 CORESETs activated with only one TCI state separately, or only one RS is to be chosen as the RS for radio link monitoring if CORESET 1 and CORESET 0 are both activated with 2 TCI states.

In some embodiments in which 2 TCI states can be activated for one CORESET, and if all the 3 CORESETs for one PDCCH are all activated with 2 TCI states respectively, up to 6 TCI states can be supported for one PDCCH, so up to 4 RSs can be used as the RSs for radio link monitoring.

Figure 14:
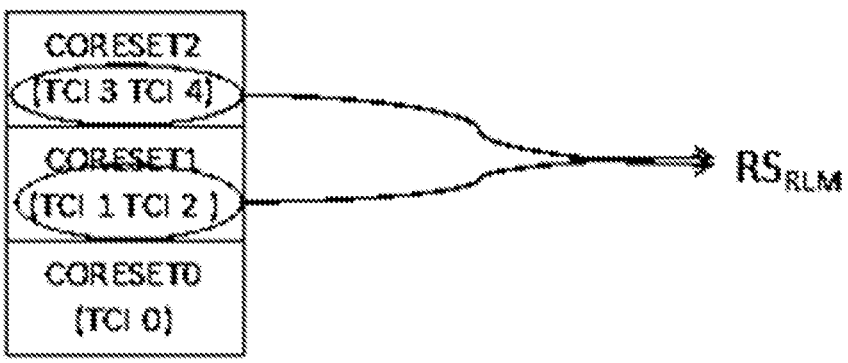
FIG. 14 illustrates radio link monitoring RS from s CORESET with 2 TCI states, in accordance with some embodiments.

FIG. 14 illustrates an approach for selecting RSs for radio link monitoring from a CORESET with 2 TCI states, in accordance with some embodiments. In some embodiments, the CORESET with 2 TCI states can have a higher priority than a CORESET with only one TCI state, as shown in FIG. 14, CORESEST 2 and CORESET 1 are both activated with 2 TCI states respectively, and the 4 RSs in these 4 TCI states can be used as the radio link monitoring RSs.

Figure 15:
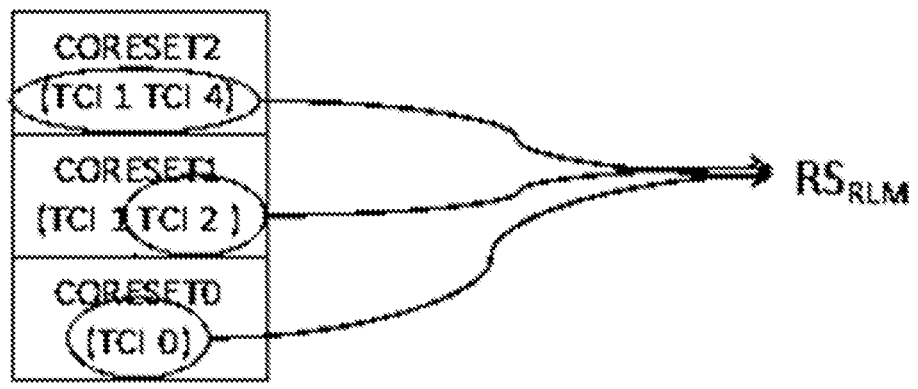
FIG. 15 illustrates radio link monitoring RS from a CORESET with a higher index, in accordance with some embodiments.

FIG. 15 illustrates an approach for selecting a RS for radio link monitoring from a CORESET with a higher index (e.g., index value that is higher), in accordance with some embodiments. In some embodiments, if at least one TCI state (e.g., TCI 1) in CORESET 2 and CORESET 1 is the same, the same TCI state (TCI 1) in CORESEST 1 is to be ignored and the RS in CORESET 0 is to be chosen as a radio link monitoring RS. As shown in FIG. 15, TCI 1 is activated for both CORESET 2 and CORESET 1, and the radio link monitoring RSs are provided from a CORESET with a higher index if the CORESETs are in the search space with the same periodicity, the TCI 1 in CORESET 1 is to be ignored, and the RS in TCI 0 in CORESET 0 is to be provided as a RS for radio link monitoring.

In some embodiments, for the time line of CSI reporting, CSI reporting timing is associated with the cyclic prefix (CP) length of a PDCCH which triggered the CSI reporting. In some embodiments of SFN-based transmission, a PDCCH can be activated with 2 TCI states and be transmitted from different TRPs. In some embodiments, if the PDCCH is transmitted from different TRPs with different carrier spacing, the CP length of the PDCCH is not the same.

Disclosed herein are embodiments of a method of deciding/determining a time for CSI reporting in view of the different times between these two different carrier spacing.

Some embodiments use the smaller carrier spacing, because a smaller carrier spacing is associated with a larger time duration for the CP, and this can make sure there is enough time for CSI reporting based on the PDCCH activated with 2 TCI states.

In some embodiments, consider that time gaps between CSI reporting and the scheduling DCI, and between the CSI reporting and the related RS resource set in the CSI reporting configuration are different for different scenarios because of the complexity of CSI reporting function, wherein the time between CSI reporting and the scheduling DCI, and the time between CSI reporting and the related RS are not to be smaller than the corresponding time gaps, respectively.

In some embodiments, for frequency offset reporting, the processing time is not more complex than SINR and RSRP reporting for CSI-RS and SSB, so the time gaps for frequency offset reporting and scheduling DCI, marked as $Z_1$ or $Z_3$, and the time gaps for frequency offset reporting and the configured related RS, marked as $Z_1'$ or $Z_3'$, can be determined using Table 1. In some embodiments, for $Z_3'$ and $Z_3$, the time gaps can be based on UE capability for processing CSI reporting.

In some embodiments, the parameter $\mu$ corresponds to the min ($\mu_{PDCCH}$, $\mu_{CSI-RS}$, $\mu_{UL}$) where the $\mu_{PDCCH}$ corresponds to the subcarrier spacing of the PDCCH with which the DCI was transmitted and $\mu_{UL}$ corresponds to the subcarrier spacing of the PUSCH with which the CSI report is to be transmitted and $\mu_{CSI-RS}$ corresponds to the minimum subcarrier spacing of the aperiodic CSI-RS triggered by the DCI. In some embodiments, if any subcarrier spacing of the PDCCH, uplink (UL), or CSI-RS contains two values, e.g., SFN-based PDCCH activated with 2 TCI states and 2 subcarrier spacing values, the smaller one is to be used for the $\mu_{PDCCH}$, $\mu_{CSI-RS}$, $\mu_{UL}$, for selecting the value CSI computation delay (e.g., time gap).

TABLE 1

| | | | | |
|---|---|---|---|---|
| CSI computation delay, is shown below: | | | | |
| | $Z_1$ [symbols] | | $Z_3$ [symbols] | |
| $\mu$ | $Z_1$ | $Z_1'$ | $Z_3$ | $Z_3'$ |
| 0 | 22 | 16 | 22 | $X_0'$ |
| 1 | 33 | 30 | 33 | $X_1'$ |
| 2 | 44 | 42 | $min(44, X_2)$ | $X_2'$ |
| 3 | 97 | 85 | $min(97, X_3)$ | $X_3'$ |

In some embodiments, for SFN-based PDSCH and PDCCH transmission, one unified or two separate higher layer parameters can configure the pre-compensation for PDSCH and PDCCH. Once the higher layer parameter(s) has/have configured the pre-compensation, two TCI states are activated for one CORESET of PDCCH and one codepoint contains two TCI states for PDSCH.

In some embodiments, SFN-based PDSCH can dynamically switch with a single TRP-based PDSCH transmission. Thus, in some embodiments, when the time offset of first PDSCH reception and the scheduling DCI is less than a threshold configured by higher layer parameter, the default TCI state of PDSCH is to be the one of the TCI state activated in the CORESET with the lowest index in the latest slot.

In some embodiments, if there are no TCI states is indicated in the DCI field, the default TCI state is the same with one of the TCI states activated in the CORESET of the scheduling PDCCH. In some embodiments, if two default TCI states are supported for PDSCH, the default TCI state for one TRP transmission is the first TCI state of the codepoint containing two TCI states.

In some embodiments, once the pre-compensation is configured, the quasi-colocation (QCL) information of one TCI state of the CORESET or the indicated codepoint is to be ignored, which may indicate that the one of the two TCI states contains all the configured QCL parameters of this QCL type, and the other TCI state contains a partial portion of the QCL parameters. In some embodiments, once a single TRP PDSCH is transmitted, the default TCI state is to contain all the configured QCL parameters and is to not be ignored. Thus, in some embodiments, the default TCI state of PDSCH of a single TRP transmission is to be the one with no parameter ignored. In some embodiments, if the default second TCI state has some QCL parameters ignored, the first TCI state is to be the default TCI state for single TRP transmission. Similarly, in some embodiments, if the default first TCI state has some QCL parameters ignored, the second TCI state is to be the default TCI state for single TRP transmission.

Figure 16:
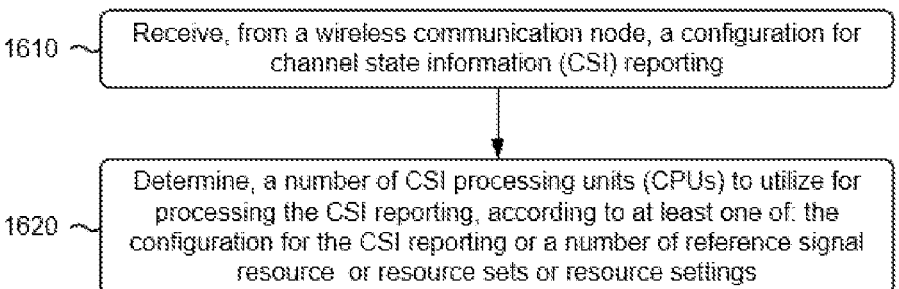
FIG. 16 illustrates a method of determining a number of CSI processing units (CPUs) to utilize for processing the CSI reporting, in accordance with some embodiments.

FIG. 16 illustrates a method 1600 of determining a number of CSI processing units (CPUs) to utilize for processing the CSI reporting, in accordance with some embodiments. Referring to FIGS. 1-15, the method 1600 can be performed by a wireless communication device (e.g., a UE) and/or a wireless communication node (e.g., base station, a gNB), in some embodiments. Additional, fewer, or different operations may be performed in the method 1600 depending on the embodiment.

In brief overview, in some embodiments, a wireless communication device receives, from a wireless communication node, a configuration for channel state information (CSI) reporting (operation 1610). In some embodiments, the wireless communication device determines a number of CSI processing units (CPUs) to utilize for processing the CSI reporting, according to at least one of: the configuration for the CSI reporting or a number of reference signal resources, resource sets, or resource settings (operation 1620).

In more detail, at operation 1610, in some embodiments, a wireless communication device receives, from a wireless communication node, a configuration for channel state information (CSI) reporting (e.g., a CSI reporting configuration). In some embodiments, the wireless communication device is a UE and the wireless communication node is a gNB. In some aspects, the configuration for CSI reporting includes at least one of: frequency offset reporting; Doppler shift reporting; or group based beam reporting. In some aspects, at least one of: group based beam reporting is enabled via at least one higher layer parameter, or the number of the resource sets, resources, or resource settings is configured to be more than one, via at least one higher layer parameter (e.g., includes at least one parameter of a RRC signaling received from the wireless communication node). In some aspects, the configuration for the CSI reporting includes at least one CSI report configuration index.

At operation 1620, in some embodiments, the wireless communication device determines a number of CPUs to utilize for processing the CSI reporting, according to at least one of: the configuration for the CSI reporting (e.g., SINR, RSRP, etc.) or a number of reference signal resources, resource sets, or resource settings (e.g., TRS). In some embodiments, the wireless communication device determines a number of CPUs to utilize for processing the CSI reporting using at least one predefined rule. In some embodiments, the number of reference signal resource sets is configured/indicated in the configuration for CSI reporting. In some aspects, the wireless communication device determines that the number of CPUs to utilize for processing the CSI reporting is one, for at least one CSI report configured to report frequency offset information (e.g., configured via higher layer parameters and/or triggered by one trigger state) corresponding to one or more reference signal (RS) resource sets or resources settings (e.g., higher layer parameter/signaling configured TRSs). In some aspects, the at least one CSI report is triggered by one trigger state.

In some aspects, the wireless communication device determines that the number of CPUs to utilize/activate/employ for processing the CSI reporting is: equal to N, which is a number of frequency offsets to be reported, or a number of configured resource sets, resources, or resource settings of reference signals (RSs, e.g., TRSs); equal to N, which is a number of frequency offsets to be reported, or a number of configured resource sets, resources, or resource settings of the RSs, or N number of CSI reports; equal to (N−1), which is a number of relative frequency offsets (e.g., difference values of frequency offsets) to be reported, or N number of configured resource sets, resources, or resource settings of the RSs; or equal to (N−1), which is a number of relative frequency offsets being reported, or a number of resource sets, resources, or resource settings of the RSs, or N number of configured CSI reports. In some embodiments, N is a positive integer value. In some aspects, the resource sets, resources, or resource settings of the RSs are triggered by one trigger state.

In some aspects, the wireless communication device determines that the number of CPUs to utilize/employ/use for processing the CSI reporting is M. In some embodiments, M is a number of aperiodic RS resources, resource sets, or resource settings for at least one CSI reporting configuration. In some embodiments, each of the aperiodic RS resources, resource sets, or resource settings having a transmission configuration indicator (TCI) state is different from those activated for at least one of: a downlink channel (e.g., PDSCH or PDCCH), a periodic RS, a synchronization signal block (SSB), or a RS of a different type from the aperiodic RS. In some embodiments, M is a positive integer.

In some aspects, the wireless communication device determines that the number of CPUs to utilize for processing the CSI reporting is equal to N. In some embodiments, N is a number of resource sets, resources, or resource settings of configured reference signals (RSs), or a number of the RSs. In some embodiments, the number of CPUs is the same as the number of configured reference signal resource set or the number of configured RS to be reported. In some aspects, the wireless communication device determines that the number of CPUs to utilize for processing the CSI reporting is equal to 2. In some embodiments, the group based beam reporting is enabled via at least one higher layer parameter.

In some aspects, the wireless communication device determines that the number of CPUs to utilize for processing the CSI reporting is: equal to X or K. In some embodiments, X is a number of resource sets, resources, or resource settings of reference signals (RSs) to be reported, or a number of reporting beam related parameters in one reporting group. In some embodiments, K is a number of reporting groups. In some embodiments, the beam related parameters including at least one of: cri-RI-PMI-CQI; cri-RI-i1; cri-RI-i1-CQI; cri-RI-CQI; cri-RSRP; ssb-Index-RSRP; cri-RI-LI-PMI-CQI; a frequency offset; or a Doppler shift.

Figure 17:
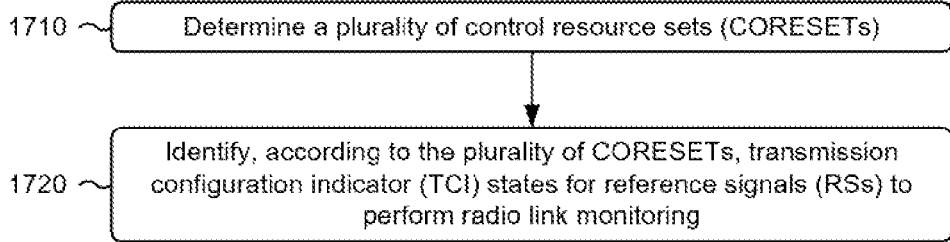
FIG. 17 illustrates a method of identifying transmission configuration indicator (TCI) states for reference signals (RSs) to perform radio link monitoring, in accordance with some embodiments.

FIG. 17 illustrates a method 1700 of identifying transmission configuration indicator (TCI) states for reference signals (RSs) to perform radio link monitoring, in accordance with some embodiments. Referring to FIGS. 1-15, the method 1700 can be performed by a wireless communication device (e.g., a UE) and/or a wireless communication node (e.g., base station, a gNB), in some embodiments. Additional, fewer, or different operations may be performed in the method 1700 depending on the embodiment.

In brief overview, in some embodiments, a wireless communication device determines a plurality of control resource sets (CORESETs) (operation 1710). In some embodiments, the wireless communication device identifies, according to the plurality of CORESETs, transmission configuration indicator (TCI) states for reference signals (RSs) to perform radio link monitoring (operation 1720).

In more detail, at operation 1710, in some embodiments, a wireless communication device determines a plurality of CORESETs. In some embodiments, the wireless communication device is a UE. In some embodiments, the wireless communication device determines the plurality of CORESETs according to a configuration received from a wireless communication node (e.g., a gNB). The configuration can have/include CORESET information. In some embodiments, the plurality of CORESETs is associated with search space sets having a same monitoring periodicity.

At operation 1720, in some embodiments, the wireless communication device identifies, according to the plurality of CORESETs, TCI states for RSs to perform radio link monitoring. In some embodiments, the wireless communication device identifies the TCI states according to an order, by performing at least one of (e.g., any one or a combination of two or more of): identifying, according to an order of indices of the CORESETs, a first CORESET activated with two TCI states; selecting at least a first of the two TCI states; selecting one of the two TCI states that is different from any TCI state activated in a CORESET with a higher index than the first CORESET; selecting a TCI state from a CORESET with a highest index that is not activated with two TCI states; excluding the two TCI states activated in the first CORESET, from selection (e.g., the CORESET with the 2 TCI states can be ignored as the radio link monitoring); or grouping all TCI states activated in a CORESET, to determine a combined block error rate (BLER), signal-to-noise-plus-interference ratio (SINR) or reference signal received power (RSRP).

Figure 18:
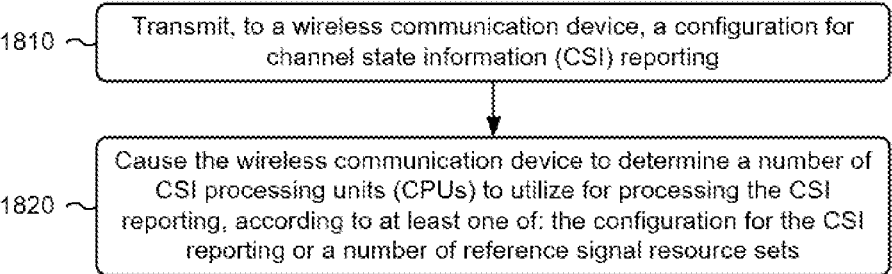
FIG. 18 illustrates a method of transmitting a configuration for channel state information (CSI) reporting, in accordance with some embodiments.

FIG. 18 illustrates a method 1800 of transmitting a configuration for channel state information (CSI) reporting, in accordance with some embodiments. Referring to FIGS. 1-15, the method 1800 can be performed by a wireless communication device (e.g., a UE) and/or a wireless communication node (e.g., base station, a gNB), in some embodiments. Additional, fewer, or different operations may be performed in the method 1800 depending on the embodiment.

In brief overview, in some embodiments, a wireless communication node transmits, to a wireless communication device, a configuration for channel state information (CSI) reporting a plurality of control resource sets (CORESETs) (operation 1810). In some embodiments, the wireless communication node causes the wireless communication device to determine a number of CSI processing units (CPUs) to utilize for processing the CSI reporting, according to at least one of: the configuration for the CSI reporting or a number of reference signal resource sets (operation 1820).

In more detail, at operation 1810, in some embodiments, a wireless communication node transmits, to a wireless communication device, a configuration for CSI reporting a plurality of CORESETs. In some embodiments, the wireless communication node is a gNB and the wireless communication device is a UE. In some aspects, the configuration for CSI reporting includes at least one of: frequency offset reporting; Doppler shift reporting; or group based beam reporting.

At operation 1820, in some embodiments, the wireless communication node causes the wireless communication device to determine a number of CPUs to utilize for processing the CSI reporting, according to at least one of: the configuration for the CSI reporting or a number of reference signal resource sets. In some embodiments, the wireless communication device determines a number of CPUs to utilize for processing the CSI reporting using at least one predefined rule. In some embodiments, the CSI reporting includes a calculated/estimated RSRP, a BLER and/or a SINR. In some embodiments, the reference signal resource set is or includes a tracking reference signal (TRS).

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method, comprising:
receiving, by a wireless communication device from a wireless communication node, a configuration for channel state information (CSI) reporting; and
determining, by the wireless communication device, a number of CSI processing units (CPUs) to utilize for processing the CSI reporting, according to at least one of: the configuration for the CSI reporting, wherein the configuration for CSI reporting includes at least one of frequency offset reporting or Doppler shift reporting.

2. The method of claim 1, wherein the configuration for CSI reporting includes
group based beam reporting.

3. The method of claim 1, comprising:
determining, by the wireless communication device, that the number of CPUs to utilize for processing the CSI reporting is one, for at least one CSI report configured to report frequency offset information corresponding to one or more reference signal (RS) resource sets or resources settings.

4. The method of claim 3, wherein:
the at least one CSI report is triggered by one trigger state.

5. The method of claim 1, comprising:
determining, by the wireless communication device, that the number of CPUs to utilize for processing the CSI reporting is:
equal to N, which is a number of frequency offsets to be reported, or a number of configured resource sets, resources, or resource settings of reference signals (RSs);
equal to N, which is a number of frequency offsets to be reported, or a number of configured resource sets, resources, or resource settings of the RSs, or N number of CSI reports;
equal to (N−1), which is a number of relative frequency offsets to be reported, or N number of configured resource sets, resources, or resource settings of the RSs; or
equal to (N−1), which is a number of relative frequency offsets being reported, or N number of configured resource sets, resources, or resource settings of the RSs, or a number of CSI reports,
wherein N is a positive integer value.

6. The method of claim 5, wherein:
the resource sets, resources, or resource settings of the RSs are triggered by one trigger state.

7. The method of claim 1, wherein:
the configuration for the CSI reporting includes at least one CSI report configuration index.

8. The method of claim 1, comprising:
determining, by the wireless communication device, that the number of CPUs to utilize for processing the CSI reporting is M, which is a number of aperiodic RS resources, resource sets, or resource settings for at least one CSI reporting configuration, wherein each of the aperiodic RS resources, resource sets, or resource settings having a transmission configuration indicator (TCI) state is different from those activated for at least one of: a downlink channel, a periodic RS, a synchronization signal block (SSB), or a RS of a different type from the aperiodic RS, wherein M is a positive integer value.

9. The method of claim 1, comprising:

determining, by the wireless communication device, that the number of CPUs to utilize for processing the CSI reporting is equal to N, which is a number of resource sets, resources, or resource settings of configured reference signals (RSs), or a number of the RSs.

10. The method of claim 9, wherein at least one of:

group based beam reporting is enabled via at least one higher layer parameter, or the number of the resource sets, resources, or resource settings is configured to be more than one, via at least one higher layer parameter.

11. The method of claim 1, comprising:

determining, by the wireless communication device, that the number of CPUs to utilize for processing the CSI reporting is equal to 2, wherein group based beam reporting is enabled via at least one higher layer parameter.

12. The method of claim 1, comprising:

determining, by the wireless communication device, that the number of CPUs to utilize for processing the CSI reporting is:

equal to X, which is a number of resource sets, resources, or resource settings of configured reference signals (RSs), or a number of reporting beam related parameters in one reporting group; or equal to K, which is a number of reporting groups.

13. A method, comprising:

transmitting, by a wireless communication node to a wireless communication device, a configuration for channel state information (CSI) reporting; and causing the wireless communication device to determine a number of CSI processing units (CPUs) to utilize for processing the CSI reporting, according to the configuration for the CSI reporting, wherein the configuration for CSI reporting includes at least one of frequency offset reporting or Doppler shift reporting.

14. A wireless communication node, comprising:

at least one processor configured to:

transmit, via a transmitter to a wireless communication device, a configuration for channel state information (CSI) reporting; and cause the wireless communication device to determine a number of CSI processing units (CPUs) to utilize for processing the CSI reporting, according to the configuration for the CSI reporting, wherein the configuration for CSI reporting includes at least one of frequency offset reporting or Doppler shift reporting.

15. A wireless communication device, comprising:

at least one processor configured to:

receive, via a receiver from a wireless communication node, a configuration for channel state information (CSI) reporting; and determine a number of CSI processing units (CPUs) to utilize for processing the CSI reporting, according to at least one of: the configuration for the CSI reporting, wherein the configuration for CSI reporting includes at least one of frequency offset reporting or Doppler shift reporting.

16. The wireless communication device of claim 15, wherein the configuration for CSI reporting includes group based beam reporting.

17. The wireless communication device of claim 15, wherein the at least one processor is configured to:

determine that the number of CPUs to utilize for processing the CSI reporting is one, for at least one CSI report configured to report frequency offset information corresponding to one or more reference signal (RS) resource sets or resources settings.

18. The wireless communication device of claim 15, wherein the at least one processor is configured to:

determine that the number of CPUs to utilize for processing the CSI reporting is:

equal to N, which is a number of frequency offsets to be reported, or a number of configured resource sets, resources, or resource settings of reference signals (RSs);

equal to N, which is a number of frequency offsets to be reported, or a number of configured resource sets, resources, or resource settings of the RSs, or N number of CSI reports;

equal to (N−1), which is a number of relative frequency offsets to be reported, or N number of configured resource sets, resources, or resource settings of the RSs; or equal to (N−1), which is a number of relative frequency offsets being reported, or N number of configured resource sets, resources, or resource settings of the RSs, or a number of CSI reports, wherein N is a positive integer value.

19. The wireless communication device of claim 15, wherein:

the configuration for the CSI reporting includes at least one CSI report configuration index.

20. The wireless communication device of claim 15, wherein the at least one processor is configured to:

determine that the number of CPUs to utilize for processing the CSI reporting is M, which is a number of aperiodic RS resources, resource sets, or resource settings for at least one CSI reporting configuration, wherein each of the aperiodic RS resources, resource sets, or resource settings having a transmission configuration indicator (TCI) state is different from those activated for at least one of: a downlink channel, a periodic RS, a synchronization signal block (SSB), or a RS of a different type from the aperiodic RS, wherein M is a positive integer value.

* * * * *